US012657836B2

(12) United States Patent
Jain

(10) Patent No.: US 12,657,836 B2
(45) Date of Patent: *Jun. 16, 2026

(54) VISUAL DISPLAY SYSTEMS AND METHOD FOR MANIPULATING IMAGES OF A REAL SCENE USING AUGMENTED REALITY

(71) Applicant: Capital One Services, LLC, McLean, VA (US)

(72) Inventor: Chintan Jain, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 302 days.

This patent is subject to a terminal disclaimer.

(21) Appl. No.: 18/313,293

(22) Filed: May 5, 2023

(65) Prior Publication Data

US 2023/0274514 A1      Aug. 31, 2023

Related U.S. Application Data

(63) Continuation of application No. 17/338,837, filed on Jun. 4, 2021, now Pat. No. 11,670,058, which is a
(Continued)

(51) Int. Cl.
*G06T 19/00* (2011.01)
*G06F 16/583* (2019.01)
(Continued)

(52) U.S. Cl.
CPC ........ *G06T 19/006* (2013.01); *G06F 16/5838* (2019.01); *G06F 21/31* (2013.01);
(Continued)

(58) Field of Classification Search
CPC ... G06T 19/006; G06T 11/60; G06F 16/5838; G06F 21/31; G06F 21/36; H04L 63/0838;
(Continued)

(56) References Cited

U.S. PATENT DOCUMENTS 9,977,882 B2 * 5/2018 Scavezze .............. H04W 12/06
10,147,399 B1 * 12/2018 Mott ...................... G06V 20/10
(Continued)

OTHER PUBLICATIONS

Raghav ("Understanding of Convolutional Neural Network (CNN)—Deep Learning", Mar. 4, 2018, https://medium.com/@RaghavPrabhu/understanding-of-convolutional-neural-network-cnn-deep-learning-99760835f148) (Year: 2018).*

*Primary Examiner* — Xin Sheng
(74) *Attorney, Agent, or Firm* — Foley & Lardner LLP

(57)      ABSTRACT

The present disclosure relates to a visual display system for manipulating images of a real scene using augmented reality. In one implementation, the system may include at least one processor in communication with a first mobile device; and a storage medium storing instructions that, when executed, configure the at least one processor to perform operations. The operations may include receiving a request from a mobile device to access an account of a user, receiving a first image depicting a real scene from an image sensor of the mobile device, receiving a selection of a virtual object, receiving an augmented reality image comprising the virtual object overlaid on the first image, comparing the augmented reality image to one or more stored augmented reality images, authenticating the user based on the comparison, and authorizing access to the user account based on the authentication.

19 Claims, 13 Drawing Sheets

Related U.S. Application Data continuation of application No. 16/185,269, filed on Nov. 9, 2018, now Pat. No. 11,043,032, which is a continuation of application No. 16/007,284, filed on Jun. 13, 2018, now Pat. No. 10,614,629, which is a continuation of application No. 16/000,861, filed on Jun. 5, 2018, now Pat. No. 10,157,504.

(51) Int. Cl.

| | |
|---|---|
| *G06F 21/31* | (2013.01) |
| *G06F 21/36* | (2013.01) |
| *G06T 11/60* | (2026.01) |
| *H04L 9/40* | (2022.01) |
| *H04W 4/02* | (2018.01) |
| *H04W 12/06* | (2021.01) |

(52) U.S. Cl.
CPC ............. *G06F 21/36* (2013.01); *G06T 11/60* (2013.01); *H04L 63/0838* (2013.01); *H04L 63/102* (2013.01); *H04W 4/02* (2013.01); *H04W 12/06* (2013.01); *G09G 2340/12* (2013.01); *G09G 2354/00* (2013.01)

(58) Field of Classification Search
CPC ...... H04L 63/102; H04W 4/02; H04W 12/06; G09G 2340/12; G09G 2354/00
See application file for complete search history.

(56) References Cited

U.S. PATENT DOCUMENTS

| | | | | |
|---|---|---|---|---|
| 2012/0070029 | A1* | 3/2012 | Muriello ................. | G06F 21/44 |
| | | | | 382/100 |
| 2017/0186032 | A1* | 6/2017 | Rangasamy Kannadasan ............ | |
| | | | | G06Q 30/0248 |
| 2018/0150903 | A1* | 5/2018 | Waldron ................. | G06F 3/011 |
| 2019/0371064 | A1* | 12/2019 | Anderson ............ | G06T 19/006 |

* cited by examiner

100

180

400

Receive user request to register for Augmented Reality Authentication — 402

Receive a registration image depicting a real scene from a mobile device — 404

Receive a selection of one or more virtual images to overlay on the registration image — 406

Generate an augmented reality registration image — 408

Store the augmented reality registration image in the user's account — 410

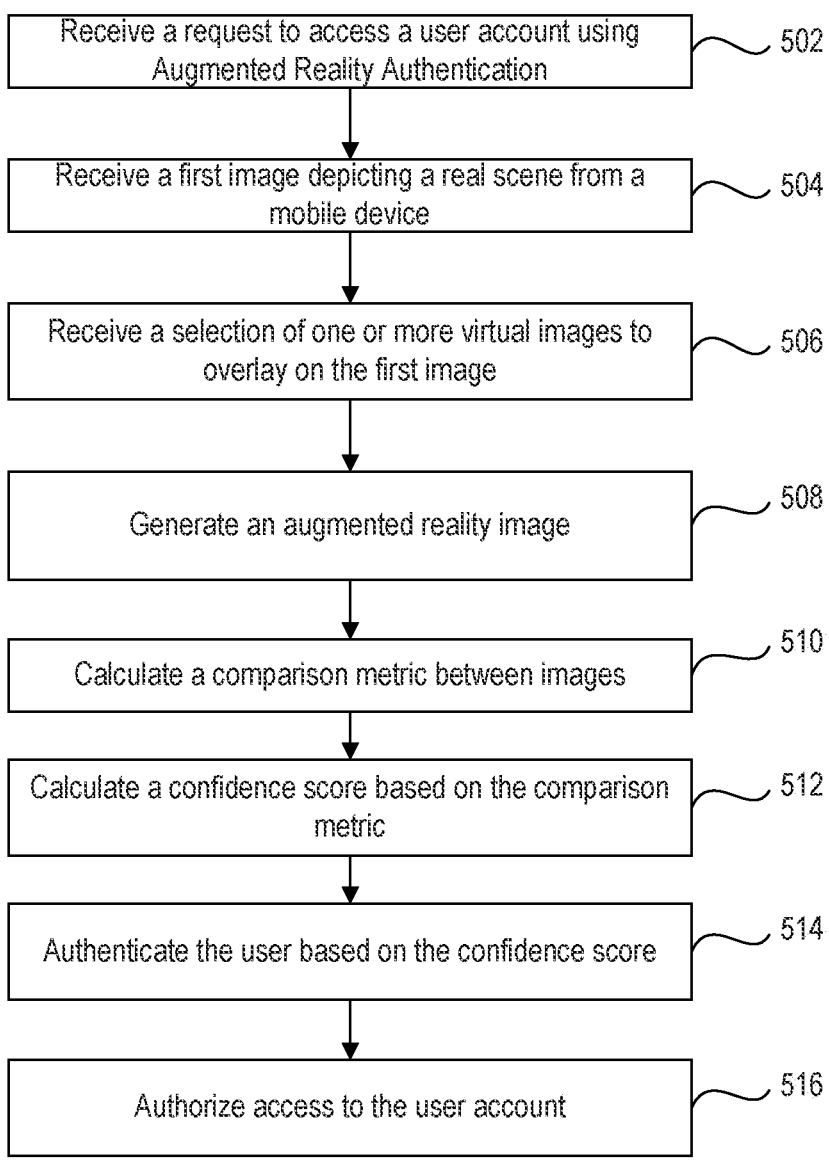

500

Receive a request to access a user account using
Augmented Reality Authentication — 502

Receive a first image depicting a real scene from a
mobile device — 504

Receive a selection of one or more virtual images to
overlay on the first image — 506

Generate an augmented reality image — 508

Calculate a comparison metric between images — 510

Calculate a confidence score based on the comparison
metric — 512

Authenticate the user based on the confidence score — 514

Authorize access to the user account — 516

Determine location of mobile device

604

Receive image from image sensor of mobile device

606

Embed location information into received image based on determined location of mobile device

700

Receive image from image sensor of mobile device — 702

Perform image verification procedure 704

Detect file format of image 706

Detect usage of image sensor 708

Detect movement of mobile device 710

Determine location of mobile device 712

Detect machine identifier 714

Verify image was received from image sensor of mobile device — 716

800

900

1102
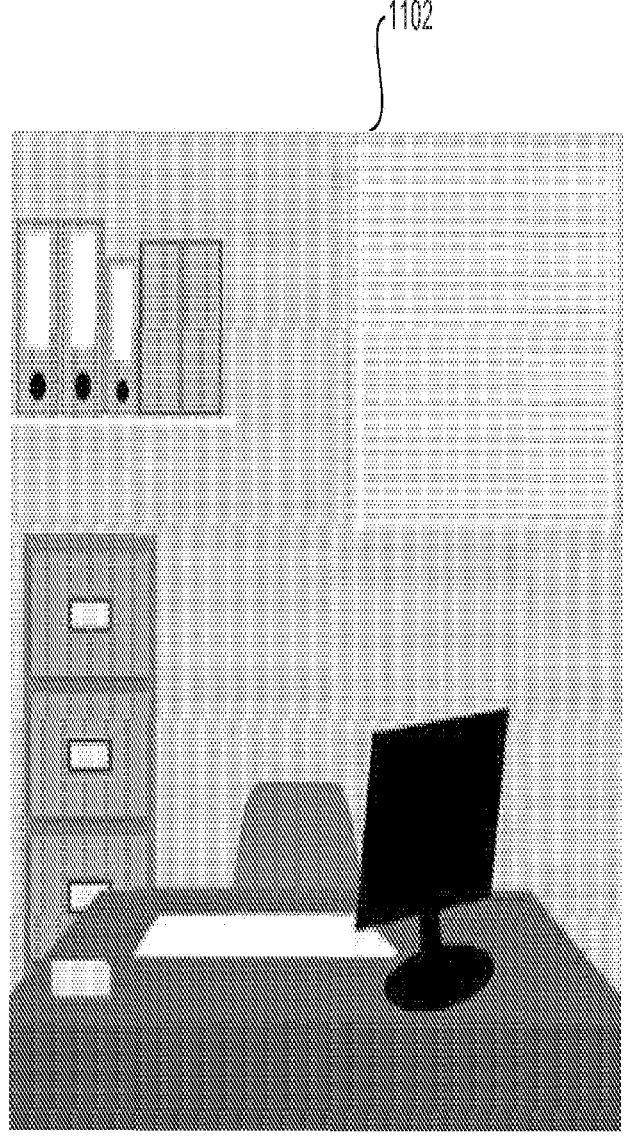
1104
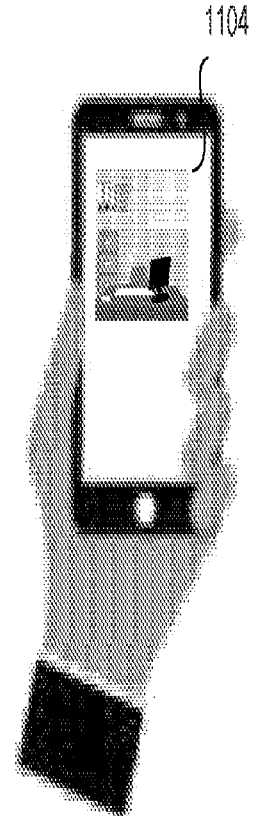
FIG. 11

1202

1302

1304

Select location to overlay virtual object

VISUAL DISPLAY SYSTEMS AND METHOD FOR MANIPULATING IMAGES OF A REAL SCENE USING AUGMENTED REALITY

CROSS-REFERENCE TO RELATED APPLICATIONS

This application is a continuation of U.S. patent application Ser. No. 17/338,837, filed Jun. 4, 2021, which is a continuation of U.S. patent application Ser. No. 16/185,269, filed Nov. 9, 2018, which is a continuation of U.S. patent application Ser. No. 16/007,284, filed Jun. 13, 2018, which is a continuation of U.S. patent application Ser. No. 16/000,861, filed Jun. 5, 2018. The content of the foregoing applications is incorporated herein in its entirety by reference.

TECHNICAL FIELD

This disclosure relates generally to the field of augmented reality. More specifically, and without limitation, this disclosure relates to systems and methods for manipulating images of a real scene using augmented reality.

BACKGROUND INFORMATION

Current techniques for authentication and verification of users suffer from multiple drawbacks. For example, in a typical authentication or verification method, a user registers for an account and provides registration information required for authentication. This registration information typically includes a username and password. As many passwords can be easily guessed, circumvented, or cracked with current technologies, users are typically required to enter a complex password consisting of a combination of different letters, numbers, and/or symbols. However, complex passwords still suffer from technical problems and create security vulnerabilities. Additionally, such passwords can be difficult for users to remember, creating greater security risks when users reuse passwords across multiple accounts or store their passwords in easily accessible locations or documents. Moreover, the typical user interfaces for authentication and verification are standardized and thus easy to manipulate, presenting further security risks. For example, common phishing scams include sending a user an email containing a link to a legitimate-looking login page, where the user is tricked into entering sensitive account information. A need therefore exists for systems and methods of providing improved authentication and verification for users in a secure, user-friendly interface.

Augmented reality technology allows virtual imagery to be mixed with a real-world physical environment. In other words, computer-generated information may be superimposed on images of real-world elements of a physical environment to provide interactive and enhanced user environment. Augmented reality techniques are typically performed in real time and in semantic context with environmental elements. Immersive perceptual information is sometimes combined with supplemental information. For example, the augmented reality view may include information related to a physical environment presented to the user, via a display.

Commercial applications for augmented reality technology are primarily for informational purposes. For example, augmented reality technology may be used in sports broadcasts to superimpose live scores over a live video feed of a sporting event. While it is known to use augmented reality tools to enrich user experience, at present, there is no available method to integrate augmented reality technology into user authentication methods.

The disclosed system and methods for presenting augmented reality content to a user address the existing problems set forth above, as well as other deficiencies in the prior art, and are directed to an improved visual display system for authenticating users by manipulating images of a real scene using augmented reality technology.

SUMMARY

Embodiments of the present disclosure use visual display systems and methods to manipulate images of a real scene using augmented reality. The visual display systems enable secure registration and authentication of users via augmented reality technology. In this manner, the disclosed embodiments can provide a marked improvement over the processes known in the prior art.

One embodiment of the present disclosure is directed to a visual display system for manipulating images of a real scene using augmented reality. The system includes at least one processor in communication with a first mobile device, and a storage medium storing instructions that, when executed, configure the at least one processor to perform operations. The operations may include receiving a request from the first mobile device to access an account of a user, receiving a first image from an image sensor of the first mobile device, the first image depicting a real scene, receiving a selection of a first virtual object, receiving an augmented reality image comprising the first virtual object overlaid on the first image, comparing the augmented reality image to one or more stored augmented reality images, authenticating the user based on the comparison, and authorizing access to the user account based on the authentication.

Another embodiment of the present disclosure is directed to a computer-implemented method for manipulating images of a real scene using augmented reality. The method comprises receiving a request from a first mobile device to access a user account, receiving a first image from an image sensor of the first mobile device, the first image depicting a real scene, receiving a selection of a virtual object, receiving an augmented reality image comprising the virtual object overlaid on the first image, comparing the augmented reality image to one or more stored augmented reality images, authenticating the user based on the comparison; and authorizing access to the user account based on the authentication.

A further embodiment of the present disclosure is directed to a non-transitory computer-readable medium. The computer-readable medium storing instructions that, when executed by at least one processor, cause the at least one processor to operate a visual display system for manipulating images of a real scene using augmented reality including receiving a request from a first mobile device to access a user account, receiving a first image from an image sensor of the first mobile device, the first image depicting a real scene, receiving a selection of a virtual object, receiving an augmented reality image comprising the virtual object overlaid on the first image, comparing the augmented reality image to one or more stored augmented reality images, authenticating the user based on the comparison, and authorizing access to the user account based on the authentication.

In some embodiments, the visual display system is configured to perform further operations including receiving a request to register the user using augmented reality, receiving a registration image from an image sensor of a second mobile device, the registration image depicting a real scene, receiving a selection of a second virtual object, generating an augmented reality registration image comprising the second virtual object overlaid on the registration image, and storing the augmented reality registration image in the user account.

In some embodiments, the visual display system is configured to perform further operations including determining a location of the second mobile device, and embedding location information into the registration image based on a determined location of the second mobile device. In further aspects, the visual display system is configured to perform further operations including determining a location of the first mobile device, and embedding location information into the first image based on a determined location of the first mobile device.

In some embodiments, the visual display system is configured to perform further operations including verifying that the first image was received from the image sensor of the first mobile device. The verification may include at least one of detecting a file format of the first image, detecting usage of the image sensor, detecting movement of the first mobile device, or determining a location of the first mobile device. In one aspect, the file format of the first image includes video data and still image data.

In some embodiments, the visual display system is configured to perform further operations including calculating a comparison metric associated with the comparison of the augmented reality image and one or more augmented reality registration images stored in a database, and matching the augmented reality image to an augmented reality registration image based on the comparison metric. In some aspects, the comparison metric comprises a metric generated by a machine learning processor.

In some embodiments, the visual display system is configured to perform further operations including calculating a first comparison metric associated with a comparison of the augmented reality image to one or more stored augmented reality registration images, and calculating a second comparison metric associated with a comparison of the first image with one or more stored registration images.

In some embodiments, the visual display system is configured to perform further operations including determining a confidence score representing a level of confidence that the augmented reality image matches the augmented reality registration image, and authenticating the user when the determined confidence score is above a first threshold. In some aspects, the user is authenticated only when the determined confidence score is at least equal to the first threshold. In yet another aspect, a verification challenge is performed when the determined confidence score is below the first threshold and above a second threshold. The verification challenge may include a one-time passcode transmitted to the user via the first mobile device. The user may be authenticated when the system receives a one-time passcode matching the transmitted one-time passcode. The one-time passcode may include a passcode valid only within a predetermined amount of time.

In some embodiments, the visual display system is configured to perform further operations including determining a confidence score based on the comparison metric. The comparison metric may include a percentage match between the augmented reality image and the augmented reality registration image. In some embodiments, the comparison metric may comprise a first comparison metric associated with a comparison of the augmented reality image to one or more stored augmented reality registration images, and a second comparison metric associated with a comparison of the first image with one or more stored registration images. In some embodiments, the confidence score is based on the first and/or the second comparison metric.

In some aspects, the confidence score is determined based on a comparison of a factor associated with the augmented reality image and the augmented reality registration image. The factor may include one or more of embedded location information, a time stamp, a date stamp, lighting conditions, or image metadata.

In some embodiments, the visual display system is configured to perform further operations including displaying the registration image on a display of the second mobile device, overlaying a grid on the displayed registration image, and overlaying the second virtual object within a user-selected position on the grid.

In some embodiments, the visual display system is configured to perform further operations including receiving a user identifier associated with the user account, retrieving an augmented reality registration image stored in the user account, and transmitting a translucent version of the augmented reality registration image for display on the first mobile device. The translucent version of the image may provide guidance for obtaining the first image.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings:

FIG. 5 is a flowchart of an exemplary method for authenticating a user using augmented reality, consistent with disclosed embodiments.

FIG. 11 is an illustration of a mobile device capturing an image of a real-world environment, consistent with disclosed embodiments.

DESCRIPTION OF THE EMBODIMENTS

The disclosed embodiments relate to systems and methods for authentication by manipulating images of a real scene using augmented reality. Reference will now be made in detail to exemplary embodiments and aspects of the present disclosure, examples of which are illustrated in the accompanying drawings. While numerous specific details are set forth in order to provide a thorough understanding of the disclosed example embodiments, it would be understood by those skilled in the art that the principles of the example embodiments may be practiced without every specific detail. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

Embodiments of the present disclosure may be implemented using a general-purpose computer. Alternatively, a special-purpose computer may be built consistent with embodiments of the present disclosure using suitable circuit elements.

As used herein, the term "image data" or "image" may refer to digital information representing an image and stored in an appropriate format. Appropriate formats include, for example, static image formats (e.g., bitmap, Graphics Interchange Format ("GIF"), Portable Network Graphics format ("PNG"), Joint Photographic Experts Group ("JPEG")) or dynamic formats (e.g., animated GIF, MPEG-4, Flash Video ("FLV"), Windows Media Video ("WMV")). The term "image data" or "image" may also refer to digital information representing an image and stored in an iOS "live" format, comprising a combination of a static image file (e.g., JPEG) and a video file (e.g., HD video or quicktime movie file).

Figure 1:
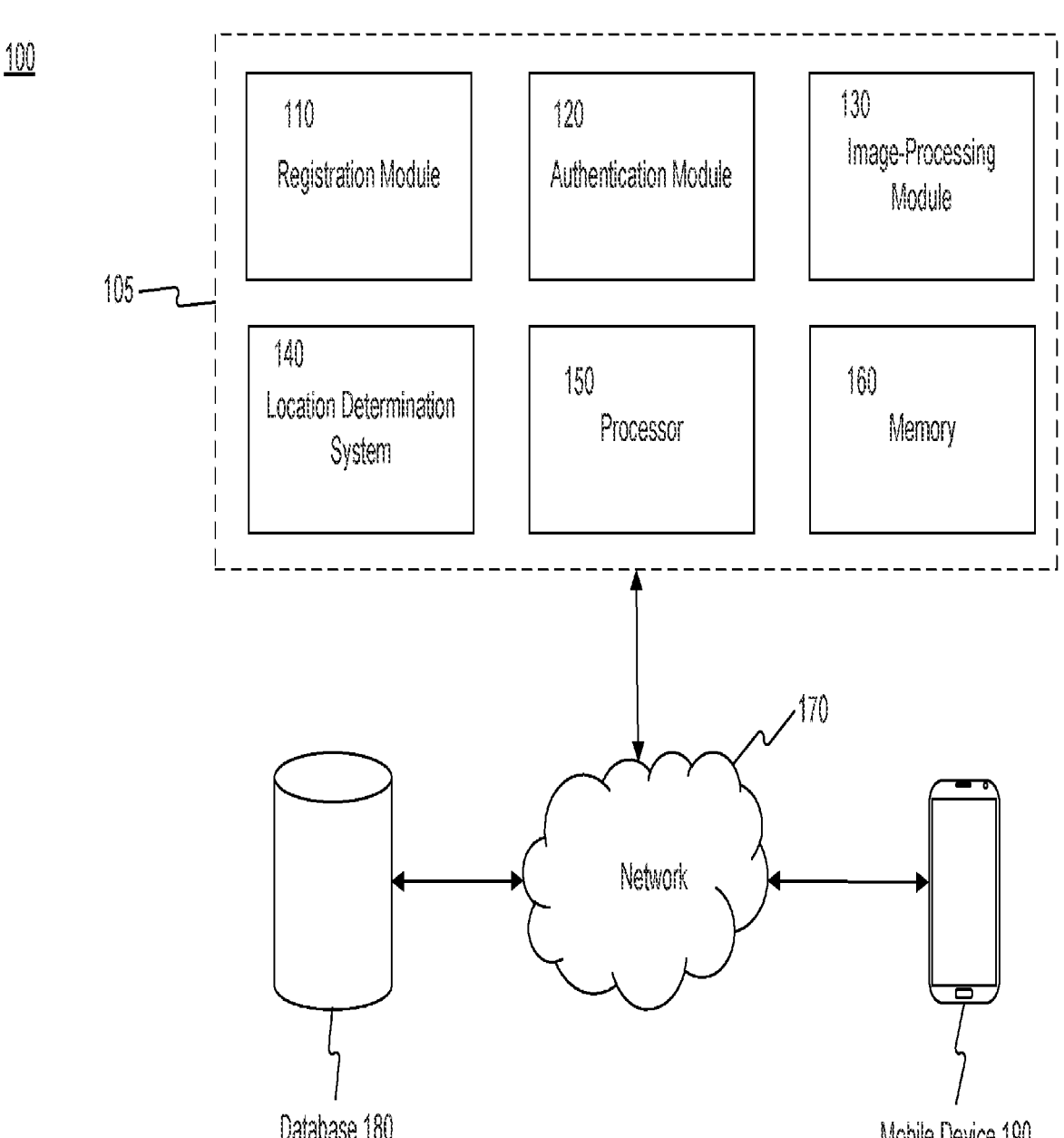
FIG. 1 is a block diagram of an exemplary system, consistent with disclosed embodiments.

FIG. 1 is a block diagram of an exemplary system 100. System 100 may be used to register and authenticate a user by manipulating images of a real scene using augmented reality, consistent with disclosed embodiments. System 100 may include a server system 105 which may include a registration module 110, an authentication module 120, an image-processing module 130, a location determination system 140, a processor 150, and a memory 160. System 100 may additionally include a database 180 and a mobile device 190. In some embodiments, as shown in FIG. 1, each component of system 100 may be connected to a network 170. However, in other embodiments components of system 100 may be connected directly with each other, without network 170.

Processor 150 may include one or more processors, microprocessors, central processing units (CPUs), computing devices, microcontrollers, digital signal processors, servers, or any combination thereof. Memory 160 may include one or more storage devices configured to store data which may be read by a processor, computer, or like device.

Memory 160 may include volatile or non-volatile, magnetic, semiconductor, tape, optical, removable, non-removable, or other types of computer-readable medium or computer-readable storage devices. For example, memory 160 may include random-access memory (RAM), such as static RAM (SRAM) or dynamic RAM (DRAM), ROM, magnetic or optical storage medium, flash memory devices, electrical, optical, acoustical or other form of propagated signals (e.g., carrier waves, infrared signals, digital signals).

Database 180 may include one or more computing devices configured to store and/or provide image data to one or more of server system 105, registration module 110, authentication module 120, image-processing module 130, location determination system 140, memory 160, and mobile device 190. In some aspects, such image data can represent images obtained from mobile device 190, registration images, virtual images depicting virtual objects, augmented reality images, and stored information about the images, such as metadata. In some aspects, database 180 may include image data needed for the registration process described below in connection with FIG. 4, and/or the authentication process described below in connection with FIG. 5. In some aspects, database 180 may include location information obtained from location determination system 140. A "module" may be a device implemented in hardware, software, firmware, or any combination thereof.

Database 180 may include one or more computing devices configured to store and/or provide account information relating to a user (e.g., a user account of server system 105). In some aspects, such account information may include user profile information, such as a user identifier, username, account number, login credentials, device identifier, address, passcode, or other such information. In some aspects, such account information may include personal information such as demographic (e.g., age), financial (e.g., income), marital status, and/or prior behavior information (e.g. purchase record).

Database 180 may include, for example, one or more Oracle™ databases, Sybase™ databases, or other relational databases or non-relational databases, such as Hadoop™ sequence files, HBase™, or Cassandra™. Database(s) 180 may include computing components (e.g., database management system, database server, etc.) configured to receive and process requests for data stored in memory devices of the database(s) and to provide data from the database(s).

While database 180 is shown separately, in some embodiments database 180 may be included in or otherwise related to one or more of server system 105, registration module 110, authentication module 120, image-processing module 130, memory 160, and mobile device 190.

Database 180 may be configured to collect, store, and/or maintain image data from mobile device 190. Database 180 can be configured to provide such data to the server system 105, registration module 110, authentication module 120, and image-processing module 130. Database 180 may collect image data from a variety of other sources, including, for example, online resources. Database 180 is further described below in connection with FIG. 3.

Mobile device 190 may include one or more computing devices configured to perform operations consistent with disclosed embodiments. For example, mobile device 190 may include at least one of a laptop, a tablet, a smart phone, a gaming device, a wearable computing device, or other type of computing device. Mobile device 190 may include one or more processors configured to execute software instructions stored in memory, such as memory included in mobile device 190. Mobile device 190 may include software that when executed by a processor performs Internet-related communication and content display processes. For instance, mobile device 190 may execute browser software that generates and displays interfaces including content on a display device included in, or connected to, mobile device 190. Mobile device 190 may execute applications that allow mobile device 190 to communicate with components over network 170, and generate and display content in interfaces via a display device included in mobile device 190. The display device may be configured to display images described in FIGS. 4 and 5.

The disclosed embodiments are not limited to any particular configuration of mobile device 190. For instance, mobile device 190 can be a device that stores and executes mobile applications that interact with server system 105 and/or database 180 to perform aspects of the disclosed embodiments. In certain embodiments, mobile device 190 may be configured to execute software instructions relating to location services, such as GPS locations. For example, mobile device 190 may be configured to determine a geographic location and provide location data and time stamp data corresponding to the location data. In yet other embodiments, mobile device 190 may capture video and/or images.

Registration module 110 may include one or more computing components configured to register a user for augmented reality authentication. Registration module 110 may be configured to receive and process images from mobile device 190 and/or database 180. Consistent with disclosed embodiments, these images may include registration images depicting a real scene, virtual images depicting virtual objects, and/or augmented reality images. In some embodiments, registration module 110 can be configured to communicate with authentication module 120, image-processing module 130, location determination system 140, and mobile device 190 to carry out the registration steps. Consistent with disclosed embodiments, an augmented reality registration image is stored in memory, such as memory 160, database 180, or mobile device 190. In some embodiments, registration module 110 may be implemented on mobile device 190.

Authentication module 120 may include one or more computing components configured to perform operations consistent with authenticating a user. In some embodiments, a user registers for augmented reality authentication through registration module 110. During registration, user registration information may be generated and stored in memory 160, database 180, or mobile device 190, for example. The user registration information may include the registration image and/or augmented reality registration image. To authenticate the user using authenticated reality authentication, a registered user can provide image data to the authentication module 120 via mobile device 190. Consistent with disclosed embodiments, the image data may include data representing real scenes, virtual images, augmented reality images, and/or data related to images, such as meta-data. Authentication module 120 can be configured to authenticate the user based on a comparison of the image data with previously-stored registration image data. In some embodiments, authentication module 120 can grant access to the user account based on the authentication. In some embodiments, authentication module 120 can be configured to communicate with registration module 110, image-processing module 130, location determination system 140, and mobile device 190 to carry out the authentication steps. In some embodiments, authentication module 120 may be implemented on mobile device 190.

Image-processing module 130 may include one or more computing components configured to collect and process images. Image-processing module 130 may be configured to communicate with registration module 110, authentication module 120, location determination system 140, database 180, and mobile device 190 to enable registration and/or authentication using augmented reality.

Consistent with disclosed embodiments, image-processing module 130 may be configured to perform an image verification procedure on image data. For example, the image verification procedure may receive data representing images, metadata, and other information from registration module 110, authentication module 120, location determination system 140, processor 150, memory 160, database 180, and mobile device 190 to verify that image data was received from an image sensor of a mobile device. In some embodiments, image-processing module 130 verifies the image data based on image metadata, such as file format and embedded location information. Image-processing module 130 may also verify the image data based on detected usage of a mobile device, such as usage of an image sensor or movement of the mobile device.

Consistent with disclosed embodiments, image-processing module 130 may be configured to perform image matching between information representing two or more images. For example, image-processing module 130 may receive the image data from registration module 110, authentication module 120, location determination system 140, memory 160, database 180, or mobile device 190. Image-processing module 130 may extract image features from received image data to calculate a comparison metric. In some aspects, the comparison metric is calculated using identification models. The identification models may include convolutional neural networks that determine attributes in an image based on features extracted from the image. In various aspects, identification models may include statistical algorithms to determine a similarity between images. For example, identification models may include regression models that estimate the relationships among input and output variables. In some aspects, identification models may additionally sort elements of a dataset using one or more classifiers to determine the probability of a specific outcome. Statistical identification models may be parametric, non-parametric, and/or semi-parametric models. A convolutional neural network model can be configured to process an image into a collection of features. The convolutional neural network can comprise an input layer, one or more middle layers, and one or more output layers. Image data can be applied to the input layer. In some embodiments, the input layer can comprise multiple matrices (e.g., a matrix for each of the red, green, and blue pixel values in an RGB image). In some embodiments, the input layer can comprise a single matrix (e.g., a single two-dimensional matrix of pixel brightness values). In some aspects, each middle layer and the output layer can be a deterministic function of the values of the preceding layer. The convolutional neural network can include one or more convolutional layers. Each convolutional layer can be configured to convolve one or more spatial filters with the convolutional layer input to generate a convolutional layer output tensor. In some embodiments, the convolutional neural network can also include pooling layers and fully connected layers according to methods known in the art. Identification models may also include Random Forests composed of a combination of decision tree predictors. Such decision trees may comprise a data structure mapping observations about something, in the "branch" of the tree, to conclusions about that thing's target value, in the "leaves" of the tree. Each tree may depend on the values of a random vector sampled independently and with the same distribution for all trees in the forest. Identification models may additionally or alternatively include classification and regression trees, or other types of models known to those skilled in the art.

Consistent with disclosed embodiments, image-processing module 130 may be configured to calculate a confidence score representing a confidence level that two or more images match. For example, image-processing module 130 may calculate the confidence score based on one or more factors, such as a calculated comparison metric between two or more images. In some aspects, image-processing module 130 may communicate with registration module 110, authentication module 120, location determination system 140, processor 150, memory 160, database 180, or mobile device 190 to collect and process image data, such as location information, time stamp information, date stamp information, lighting conditions, and/or image metadata to calculate the confidence score.

Consistent with disclosed embodiments, image-processing module 130 can be configured to provide the calculated confidence score to authentication module 120. Authentication module 120 may determine whether the confidence score meets a predetermined threshold before authenticating the user. In some aspects, authentication module 120 may perform a verification challenge if the confidence score is within a predetermined range. For example, the verification challenge must be performed successfully to authenticate the user.

In some embodiments, image-processing module 130 may be configured to receive image data from registration module 110 or authentication module 120 to generate data representing an augmented reality image. For example, image-processing module 130 may receive data representing one or more virtual images to superimpose on image data depicting a real scene. In some embodiments, image-processing module 130 may be implemented on mobile device 190.

FIG. 1 shows registration module 110, authentication module 120, and image-processing module 130 as different components. However, registration module 110, authentication module 120, and image-processing module 130 may be implemented in the same computing system.

Location determination system 140 may include one or more computing components configured to perform operations consistent with determining a location of a mobile device 190. In some embodiments, location determination system 140 may transmit a request to mobile device 190 for location information. In response to the request, mobile device 190 may transmit location information such as geographic coordinates or identifiers to the location determination system 140 via network 170. The location determination system 140 may map the geographic coordinates or identifiers to a specific geographic location. The location determination system 140 may include satellite-based geolocation systems, e.g., GPS, Glonass, Galileo, etc.; long-range terrestrial geolocation systems, e.g., LORAN; short-range network based geolocation systems, e.g., network-based cellular e911; short-range proximity location sensing, e.g., 802.11 access point identification, line-of-sight location identification, e.g., IRdA or other visible, sonic or invisible electromagnetic waves which are confined by barriers; RFID based location detectors; and the like.

In some embodiments, location determination system 140 can be configured to communicate with registration module 110, authentication module 120, image-processing module 130, and mobile device 190. For example, location determination module 140 may receive image data from registration module 110, authentication module 120, image-processing module 130, and/or mobile device 190, and embed location information into the image data. In some embodiments, location determination system 140 may be implemented on mobile device 190.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 170. In various embodiments, one or more components of system 100 may communicate directly through one or more dedicated communication links.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
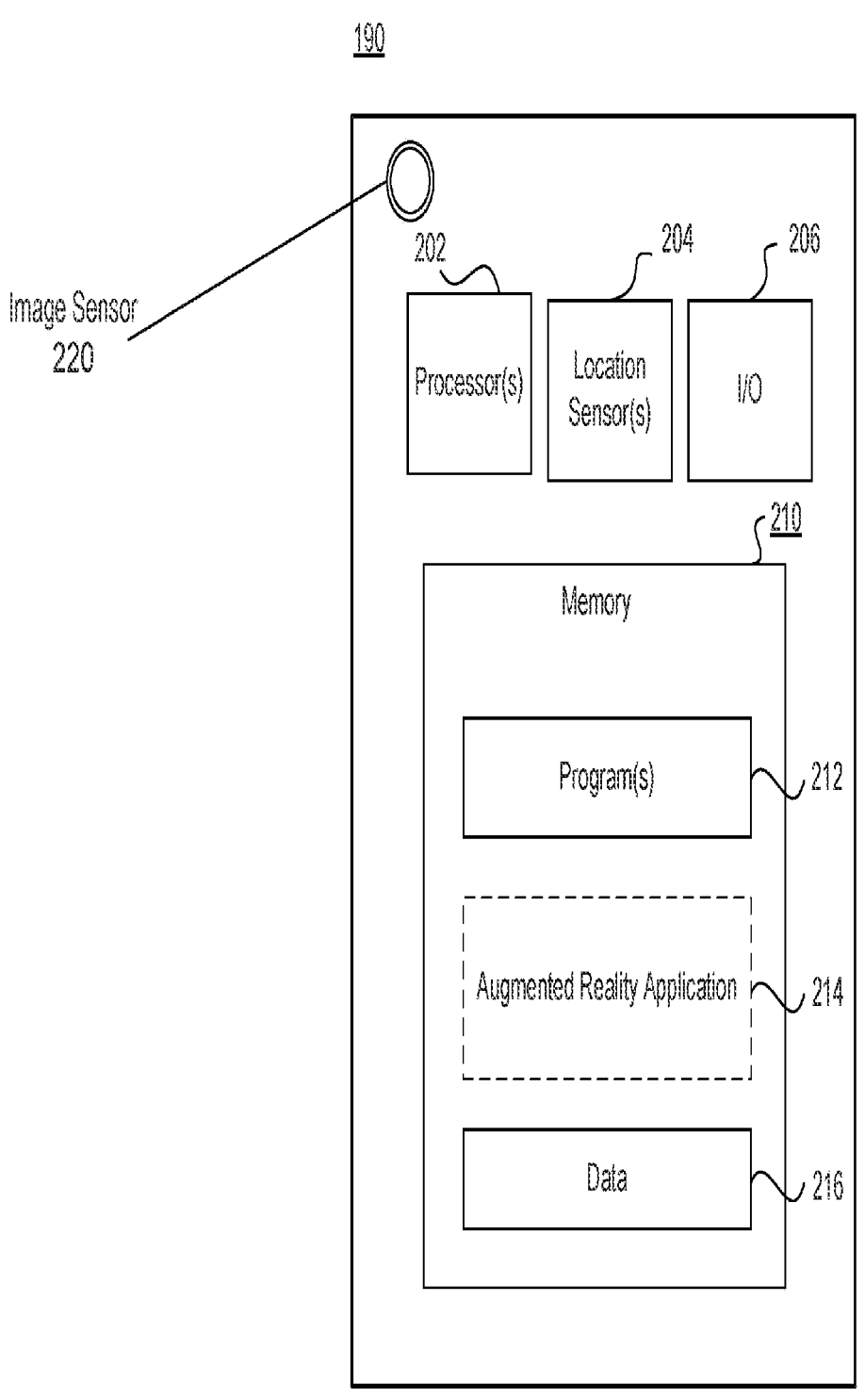
FIG. 2 is a block diagram of an exemplary mobile device, consistent with disclosed embodiments.

FIG. 2 is a block diagram of mobile device 190, consistent with disclosed embodiments. In one embodiment, mobile device 190 may include processor 202, location sensor 204, input/output (I/O) system 206, and memory 210. In some embodiments, mobile device 190 may take the form of a mobile computing device (e.g., a wearable device, smartphone, tablets, laptop, or similar device), a desktop (or workstation or similar device), or a server. Alternatively, mobile device 190 may be configured as a particular apparatus, embedded system, dedicated circuit, and the like based on the storage, execution, and/or implementation of the software instructions that perform operations consistent with the disclosed embodiments. According to some embodiments, mobile device 190 may be configured to provide a web browser or similar computing application capable of accessing web sites, consistent with disclosed embodiments.

Processor 202 may include one or more known processing devices, such as mobile device microprocessors manufactured by Intel™, NVIDIA™, or various processors from other manufacturers. As would be appreciated by one of skill in the art, the disclosed embodiments are not limited to a particular processor type.

Memory 210 may include one or more storage devices configured to store instructions for performing operations related to disclosed embodiments. For example, memory 210 may be configured with one or more software components, such as program 212, that when executed by processor 202, can cause mobile device 190 to perform operations consistent with the disclosed embodiments. The disclosed embodiments are not limited to separate programs or computers configured to perform dedicated tasks. For example, mobile device 190 can be configured to perform the disclosed functions of mobile device 190 by one or more programs stored in memory 210 (e.g., program 212). In some embodiments, memory 210 can be configured to store data 216 used by one or more programs 212. In some embodiments, program 212 may include one or more of registration module 110, authentication module 120, or image processing module 130.

In certain embodiments, memory 210 may store an augmented reality application 214 that may be executed by processor(s) 202 to perform one or more augmented reality processes consistent with disclosed embodiments. In certain aspects, augmented reality application 214, or another software component, may be configured to request identification from server system 105 or determine the location of mobile device 190.

Location sensor 204 may include sensor(s) and/or system (s) capable of determining a location of mobile device 190, such as a Global Positioning System (GPS) receiver, Bluetooth transceiver, or WiFi transceiver. When location sensor 204 includes multiple sensor(s) and/or system(s), mobile device 190 can be configured to determine geographic coordinates or identifiers, such as latitude or longitude, based on data provided from multiple sensor(s) and/or system(s). Mobile device 190 can be configured to send the geographic coordinates or identifiers determined by location sensor 204 to other components of system 100 via, for example, network 170. Location sensor 204 may also include motion sensors for detecting movement of the mobile device. For example, location sensor 204 may include a proximity sensor, accelerometer, gyroscope, magnetometer, and/or ambient light sensor.

I/O system 206 may include one or more devices configured to allow data to be received and/or transmitted by mobile device 190 and to allow mobile device 190 to communicate with other machines and devices, such as other components of system 100. For example, I/O system 206 may include a screen for providing information to the user. VO system 206 may also include components for NFC communication. I/O system 206 may also include one or more digital and/or analog devices that allow a user to interact with mobile device 190 such as a touch-sensitive area, buttons, or microphones. I/O system 206 may also include one or more accelerometers to detect the orientation and inertia of mobile device 190. I/O system 206 may also include other components known in the art for interacting with server system 105.

In some embodiments, mobile device 190 may include an image sensor 220 (e.g., a digital camera). Image sensor 220 can be configured to generate data representing still images or video and send it to other components of system 100 via, for example, network 170.

The components of mobile device 190 may be implemented in hardware, software, or a combination of both hardware and software, as will be apparent to those skilled in the art.

Figure 3:
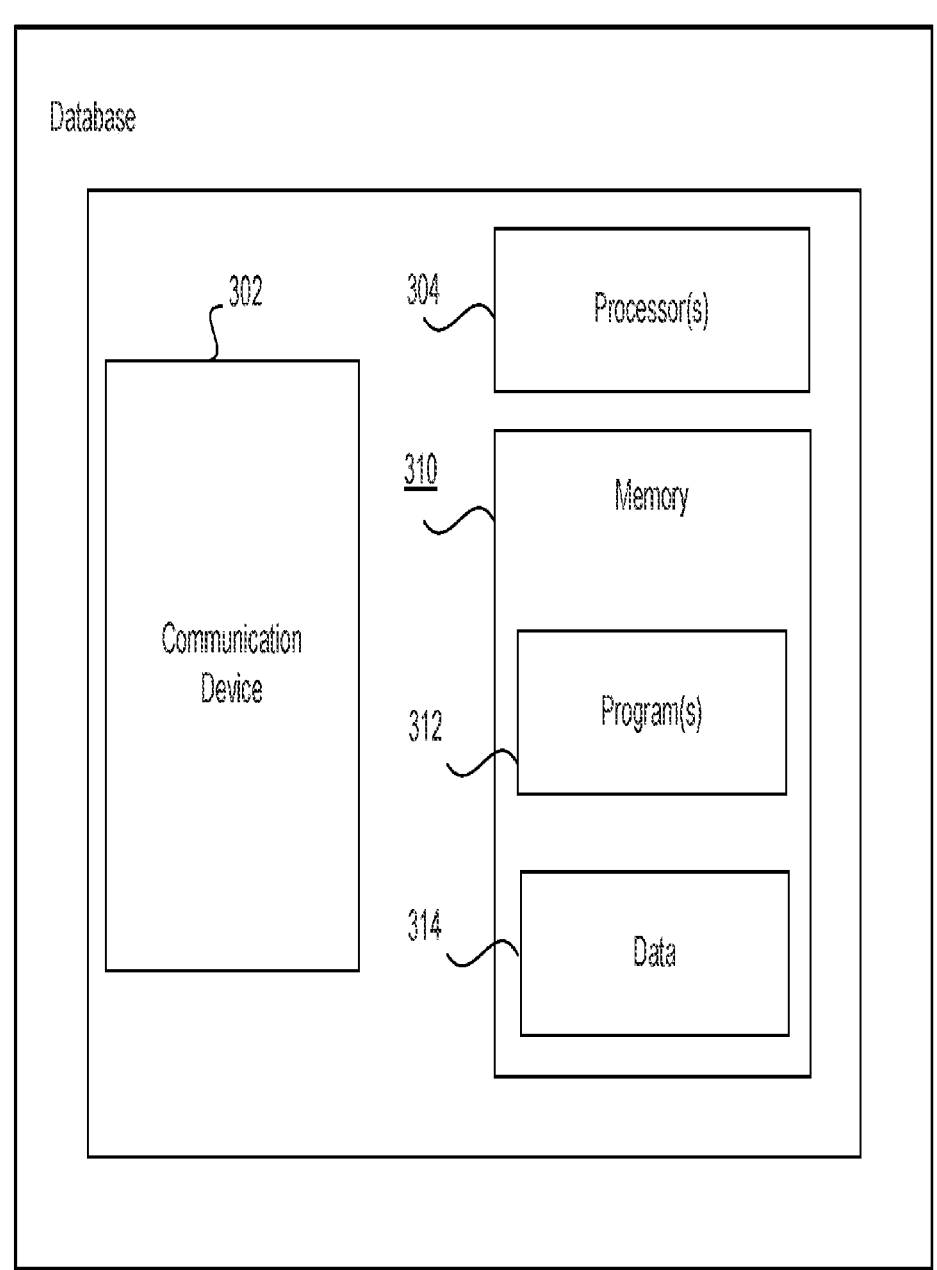
FIG. 3 is a block diagram of an exemplary database, consistent with disclosed embodiments.

FIG. 3 is a block diagram of an exemplary database 180, in accordance with disclosed embodiments. Database 180 may include a communication device 302, one or more database processors 304, and database memory 310 including one or more database programs 312 and data 314. In some embodiments, database 180 may be hosted on one or more computing devices (e.g., desktops, workstations, servers, and computing clusters).

Communication device 302 may be configured to communicate with one or more components of system 100, such as server system 105, registration module 110, authentication module 120, image-processing module 130, location determination system 140, and/or mobile device 190. In particular, communication device 302 may be configured to provide to registration module 110, authentication module

120, image-processing module 130 image data that may be used to register and/or authenticate a user.

The components of database 180 may be implemented in hardware, software, or a combination of both hardware and software, as will be apparent to those skilled in the art. For example, although one or more components of database 180 may be implemented as computer processing instruction modules, all or a portion of the functionality of database 180 may be implemented instead in dedicated electronics hardware.

Data 314 may be data associated with image data obtained from mobile device 190, registration images, virtual images depicting virtual objects, augmented reality images, and stored information about the images, such as metadata. Data 314 may include, for example, account information relating to a user such as a user identifier, username, account number, login credentials, device identifier, address, passcode, or other user profile information. Data 314 may include personal information such as demographic (e.g., age), financial (e.g., income), marital status, and/or prior behavior information (e.g. purchase record).

Figure 4:
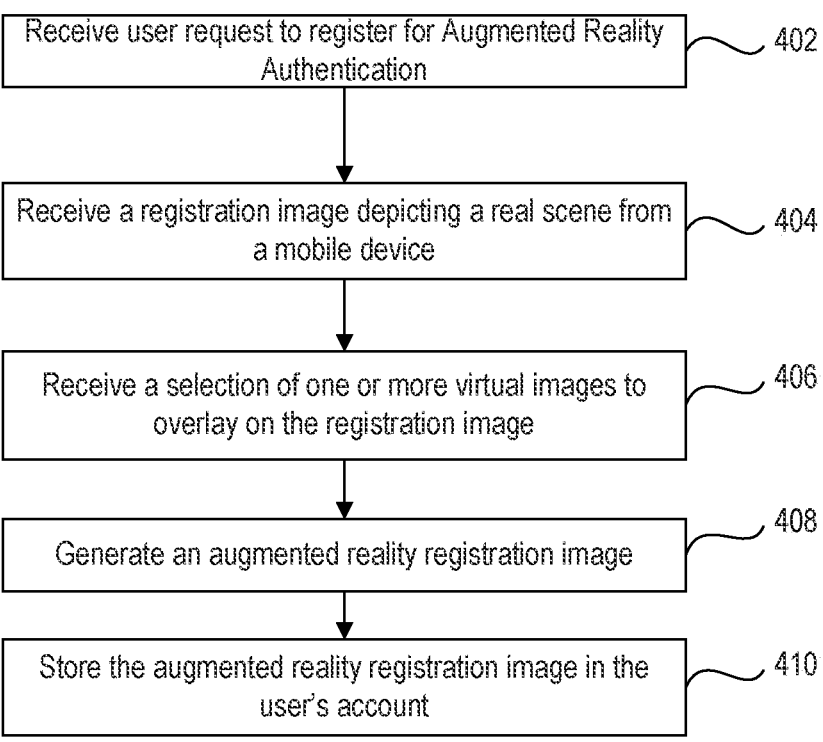
FIG. 4 is a flowchart of an exemplary method for registering for authentication using augmented reality, consistent with disclosed embodiments.

FIG. 4 is a flowchart of an exemplary method 400 for registering a user for augmented reality authentication, consistent with embodiments of the present disclosure. Method 400 can be performed using system 100. In some embodiments, one or more steps of method 400 can be performed by mobile device 190. In various embodiments, one or more steps of method 400 can be performed by server system 105. In certain embodiments, method 400 can be performed entirely by server system 105, or entirely by mobile device 190.

At step 402, system 100 receives a request from a user to register for augmented reality authentication. In some embodiments, the request is received by registration module 110 from mobile device 190 over network 170. For example, the user may interact with a user interface on the mobile device 190 to transmit the request for registration. The user may have a registered account with server system 105. In some aspects, the user may register for one or more augmented reality authentications for one or more registered accounts.

At step 404, system 100 receives registration image data depicting a real scene from a mobile device 190. In some embodiments, registration module 110 provides instructions to a user interface on the mobile device 190. For example, the user interface may instruct the user to capture an image using an image sensor 220 of mobile device 190. The image depicts a real scene such as a bedroom or office or interior of an automobile. In the example embodiments, a real scene can include any scene for which significant details remain substantially constant, such that the particular scene remains recognizable in subsequent images. In some embodiments, a registration image corresponds to a scene that is familiar to and frequented by the user. In some aspects, data representing the captured image is provided to location determination system 140, as discussed below with respect to FIG. 6. In some aspects, the captured image data is provided to image-processing module 130 to perform an image verification procedure, as discussed below with respect to FIG. 7. The registration image data may be stored in memory 160, database 180, and/or mobile device 190.

At step 406, system 100 receives a selection of one or more virtual images (or virtual objects) to overlay on the registration image. In some embodiments, registration module 110 provides instructions to a user interface on the mobile device 190. For example, the user interface may instruct the user to select one or more virtual images from a list of virtual images. In some aspects, the virtual image may depict a virtual object such as a telephone, teddy bear, geometric shapes, random objects, things or any other virtual object. The virtual images may be acquired from database 180, memory 160, and/or mobile device 190. For example, data representing the virtual images may be acquired from an image sensor 220 or data 216 of mobile device 190. The user interface may then display the registration image from step 404, and instruct the user to select a location on the registration image on which to overlay the selected one or more virtual images. For example, the user may select a first location on the registration image to overlay a first virtual image, and select a second location on the registration image to overlay a second virtual image.

At step 408, the system 100 generates an augmented reality registration image. In some aspects, the augmented reality registration image comprises the selected one or more virtual images overlaid on the registration image at the locations selected at step 406. In some embodiments, the image-processing module 130 receives data representing the registration image, the selected one or more virtual images, and the selected one or more locations on the registration image on which to overlay the selected one or more virtual images, and generates the augmented reality registration image. For example, the image-processing module 130 overlays the virtual image on the registration image at the selected location, and generates the augmented reality registration image. In some embodiments, data representing the augmented reality registration image is sent to location determination system 140, as discussed in further detail below with respect to FIG. 6. The augmented reality registration image may include image data, such as geolocation information, time stamp information, date stamp information, lighting conditions, unique device identifier (either mobile, laptop, desktop, or any IoT device) from which the image was captured and/or image metadata.

At step 410, system 100 stores the augmented reality registration image. For example, the augmented reality registration image may be stored in memory 160, database 180, and/or mobile device 190. In some aspects, the augmented reality registration image is stored in an account associated with the user.

In some embodiments, the user may repeat the steps in method 400 to register for multiple augmented reality authentications. For example, the system may generate and store multiple augmented reality registration images for one or more accounts associated with the user. This enables the system to generate augmented reality registration images for the user based on different registration images depicting real scenes. For example, the user may select their bedroom at their place of residence for a first registration image to generate a first augmented reality registration image. The user may further select their office at their place of business for a second registration image to generate a second augmented reality registration image, for added flexibility.

FIG. 5 is a flowchart of an exemplary method for authenticating a user using augmented reality, consistent with embodiments of the present disclosure. Method 500 can be performed using system 100. In some embodiments, one or more steps of method 500 can be performed by mobile device 190. In various embodiments, one or more steps of method 500 can be performed by server system 105. In certain embodiments, method 500 can be performed entirely by server system 105, or entirely by mobile device 190. According to method 500, at step 502, server system 105 can be configured to receive a request for authentication using augmented reality authentication. For example, the request may be received from (or at) a mobile device 190 associated with a user and relayed to server system 105 via network 170. In some embodiments, the request is received from the same or a different mobile device as discussed at step 402 during the registration for augmented reality authentication. In some embodiments, the user authentication request is for access to a user account (e.g., a user account of server system 105).

At step 504, system 100 is configured to receive a first image depicting a real scene. For example, the first image may be received at mobile device 190 associated with the user from sensor 220 and stored in memory 210 for processing by program 212 or application 214. In some embodiments, the first image is transmitted from mobile device 190 to server system 105 via network 170 for processing by authentication module 120 or image processing module 130. In some embodiments, the first image is received at or from the same or a different mobile device as discussed at step 402 during the registration for augmented reality authentication. Authentication module 120 may provide instructions to a user interface on the mobile device 190. For example, the user interface may instruct the user to capture an image using an image sensor 220 of mobile device 190. The user may be instructed to capture substantially the same image as that taken in step 404 during registration. In some aspects, the captured image is provided to location determination system 140, as discussed below with respect to FIG. 6. In some aspects, the captured image is provided to image-processing module 130 to perform an image verification procedure, as discussed below with respect to FIG. 7. The registration image may be stored in memory 160, database 180, and/or mobile device 190.

In some embodiments, authentication module 120 may transmit instructions to the user interface of mobile device 190 to aid the user with the authentication process. For example, the instructions may provide the user interface with a visual aid. In some embodiments, the user is prompted to enter a user identifier associated with the user account after step 502. For example, the user may be prompted to enter a username, token, passcode, mobile device identifier, or other identifier. In some embodiments, the request at step 502 includes the user identifier, mobile device identifier, or a determined location of the mobile device. For example, the user identifier, mobile device identifier, or determined location of the mobile device may be stored in memory 210 and/or transmitted automatically from mobile device 190. Authentication module 120, after receiving the identifier, may then retrieve registration image or augmented reality registration image stored in an account associated with the identifier. For example, the retrieved registration image or augmented reality registration image may be displayed on the user interface of mobile device 190.

In some embodiments, authentication module 120 may compare the determined location of the mobile device with location information embedded in the registration image or augmented reality registration image stored in an account associated with the identifier. For example, authentication module 120 may retrieve the registration image or augmented reality registration image for display on mobile device 190 when the determined location is within a threshold distance of a location determined from the location information embedded in the registration image or augmented reality registration image. In another example, authentication module 120 may retrieve the registration image or augmented reality registration image when the determined location is within a geofence area associated with the location information embedded in the registration image or augmented reality registration image.

In some embodiments, the displayed registration image or augmented reality registration image is a translucent version of the original image. For example, if the location of the device matches the geolocation of the original image, the user may use a translucent version of the original image as a guide for capturing substantially the same image of the real scene as depicted in the registration image or the augmented reality registration image. For example, user may be prompted to capture the same image of the real scene using sensor 220 of mobile device 190.

In some embodiments, system 100 is configured to pre-process the received first image before displaying the retrieved registration image or augmented reality registration image on the user interface of mobile device 190. For example, the first image may be preprocessed to identify some features within the image for comparison with similar features identified in the registration image or augmented reality registration image. For example, the first image may be preprocessed to identify significant features or landmarks within the image, such as a desk, a window, or a bed. If a comparison with the retrieved registration image or augmented reality registration image meets a threshold similarity value, i.e., a threshold match, with respect to the identified significant features or landmarks, the retrieved registration image or augmented reality registration image is displayed on the user interface of mobile device 190. In some embodiments, authentication module 120 may retrieve the registration image or augmented reality registration image for display on mobile device 190 when there is a threshold match with respect to the identified significant features or landmarks, as described above, and when a location of the mobile device is within a threshold distance of a location determined from the location information embedded in the registration image or augmented reality registration image. In some embodiments, authentication module 120 or image processing module 130 may be configured to preprocess the first image.

In some embodiments, system 100 is configured to pre-process an image depicting a real scene obtained from sensor 220 in real-time, before capturing the first image. For example, preprocessing of the image may be conducted in real-time on the mobile device 190, to identify significant features or landmarks within the image as described above. In some embodiments, preprocessing of the image must yield a threshold match with respect to the identified significant features or landmarks within a predetermined amount of time. For example, if the predetermined amount of time expires before yielding a match, method 500 may end without authenticating the user. In some embodiments, the registration image or augmented reality registration image is displayed on the mobile device 190 for a predetermined amount of time to assist the user.

At step 506, system 100 is configured to receive a selection of one or more virtual images to overlay onto the first image. In some embodiments, mobile device 190 receives the selections of virtual images and store the selections in memory 210 for processing by program 212 or application 214. In some embodiments, mobile device 190 transmits the selections of virtual images to server system 105 via network 170 for processing by authentication module 120 or image processing 130. The selection of virtual images in step 506 may proceed similarly to the selection of virtual images in step 406. In some embodiments, authentication module 120 provides instructions to a user interface on the mobile device 190. For example, the user interface may instruct the user to select one or more virtual images from a list of virtual images. In some aspects, the virtual image may depict a virtual object such as a telephone, teddy bear, geometric shapes, random objects, things or any other virtual object. The virtual images may be acquired from database 180, memory 160, and/or mobile device 190. For example, the virtual images may be acquired from an image sensor 220 or data 216 of mobile device 190. In some embodiments, the list of virtual images includes a set of new virtual objects that have not been previously selected by the user. The user interface may then display the first image from step 504, and instruct the user to select a location on the first image on which to overlay the selected one or more virtual images. For example, the user may select a first location on the first image to overlay a first virtual object, and select a second location on the first image to overlay a second virtual object.

At step 508, system 100 generates an augmented reality image. In some embodiments, program 212 or application 214 of mobile device 190 generates the augmented reality image and stores the image in memory 210. In some embodiments, mobile device 190 transmits the first image and the selections of virtual images to server system 105 via network 170, as described above, to generate the augmented reality image. For example, authentication module 120 or image processing 130 may generate the augmented reality image. In some embodiments, step 508 may proceed similarly to the generation of augmented reality image in step 408. In some aspects, the augmented reality image comprises the selected one or more virtual images overlaid on the first image at the locations selected at step 506.

In some embodiments, image-processing module 130 receives the first image, the selected one or more virtual images, and the selected one or more locations on the first image on which to overlay the selected one or more virtual images, and generates the augmented reality image. For example, image-processing module 130 overlays the virtual image on the first image at the selected location, and generates the augmented reality image. In some embodiments, the augmented reality image, and/or the first image, is sent to location determination system 140, as discussed in further detail below with respect to FIG. 6. The augmented reality image may include image data, such as location information, time stamp information, date stamp information, lighting conditions, and/or image metadata.

At step 510, server system 105 calculates a comparison metric, as described in further detail below with respect to FIG. 8. For example, image-processing module 130 may receive the first image from step 504, the selection of one or more virtual images of step 506, and/or the augmented reality image generated in step 508, and calculate a comparison metric reflecting a percentage match between two or more of the images, as discussed in further detail with respect to FIG. 8. In some embodiments, the comparison metric reflects a percentage match between the augmented reality image and the one or more stored augmented reality images. In some embodiments, the stored augmented reality images include one or more augmented reality registration images generated during method 400. In some embodiments, comparison metric is calculated at mobile device 190.

At step 512, server system 105 calculates a confidence score, as described in further detail below with respect to FIG. 10. In some embodiments, image-processing module 130 calculates a confidence score based on the comparison metric and/or additional parameters, as discussed in further detail with respect to FIG. 10. For example, the confidence score may be calculated based on location, time stamp, and/or date stamp information relating to the images, lighting conditions, image metadata, and/or device information. In some embodiments, the confidence score is calculated at mobile device 190.

At step 514, server system 105 authenticates the user based on the confidence score calculated at step 512. For example, authentication module 120 may authenticate the user based on a comparison of the confidence score and a number of predetermined thresholds, as discussed in further detail with respect to FIG. 9 below.

In some embodiments, method 500 may proceed directly from step 506 to step 510 to calculate the comparison metric. For example, server system 105 may receive the first image at step 504 and the virtual images at step 506, and calculate the comparison metric. The comparison metric may reflect a percentage match between the first image and the registration image, a percentage match between the virtual images received at step 506 and the virtual images received during registration at step 406, or a percentage match between a combination of the images. Here, the method continues to step 512 to calculate the confidence score based on the comparison metric. For example, the confidence score may be calculated based on the comparison metric and location information associated with the images and mobile device 190, as discussed in further detail below with respect to FIG. 10.

At step 516, server system 105 authorizes access based on the authentication. For example, server system 105 may authorize access to an account associated with the user (e.g., a user account of server system 105) based on the authentication. In some embodiments, the example authentication techniques may be configured to enable access to data on mobile device 190.

Figure 6:
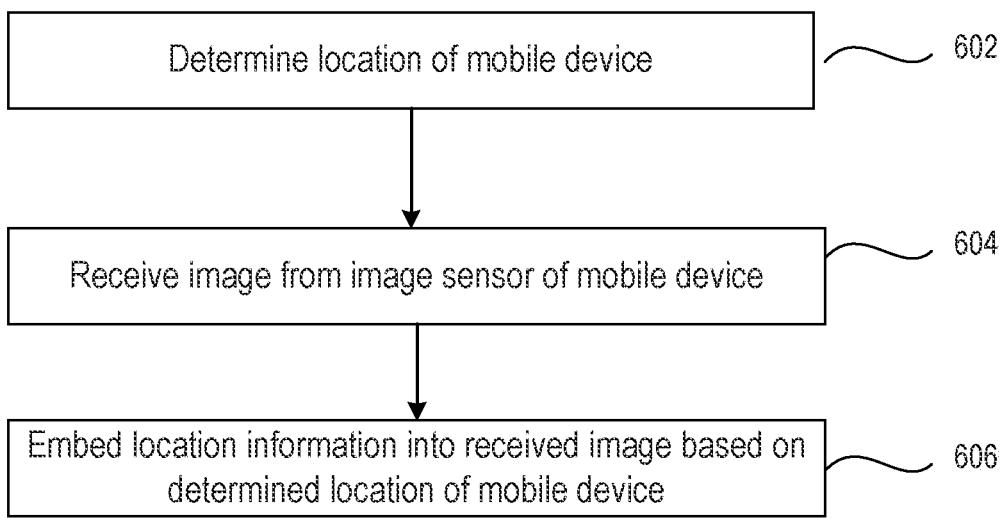
FIG. 6 is a flowchart of an exemplary method for embedding location information in images, consistent with disclosed embodiments.

FIG. 6 is a flowchart of an exemplary method for embedding location information in images, consistent with embodiments of the present disclosure. In some embodiments, method 600 is implemented by location determination system 140 on server system 105 or on mobile device 190. In some embodiments, one or more steps of method 600 can be performed by mobile device 190. In various embodiments, one or more steps of method 600 can be performed by server system 105. In certain embodiments, method 600 can be performed entirely by server system 105, or entirely by mobile device 190.

At step 602, the location of mobile device 190 is determined (e.g., using location sensors 204).

At step 604, an image is received from mobile device 190. For example, the image may be received from image sensor 220. In some embodiments, the image is received from registration module 110, authentication module 120, image-processing module 130, memory 160, or database 180. The image may depict a real scene captured by image sensor 220, a virtual image, or an augmented reality image generated at steps 408 and 508, as disclosed above.

At step 606, location information determined from step 602 is embedded into the image. For example, geolocation data may be embedded in the image as metadata. In some embodiments, method 600 includes only steps 602 and 604. For example, location determination system 140 may embed the location information in an image stored registration module 110, authentication module 120, image-processing module 130, memory 160, database 180, or mobile device 190.

Figure 7:
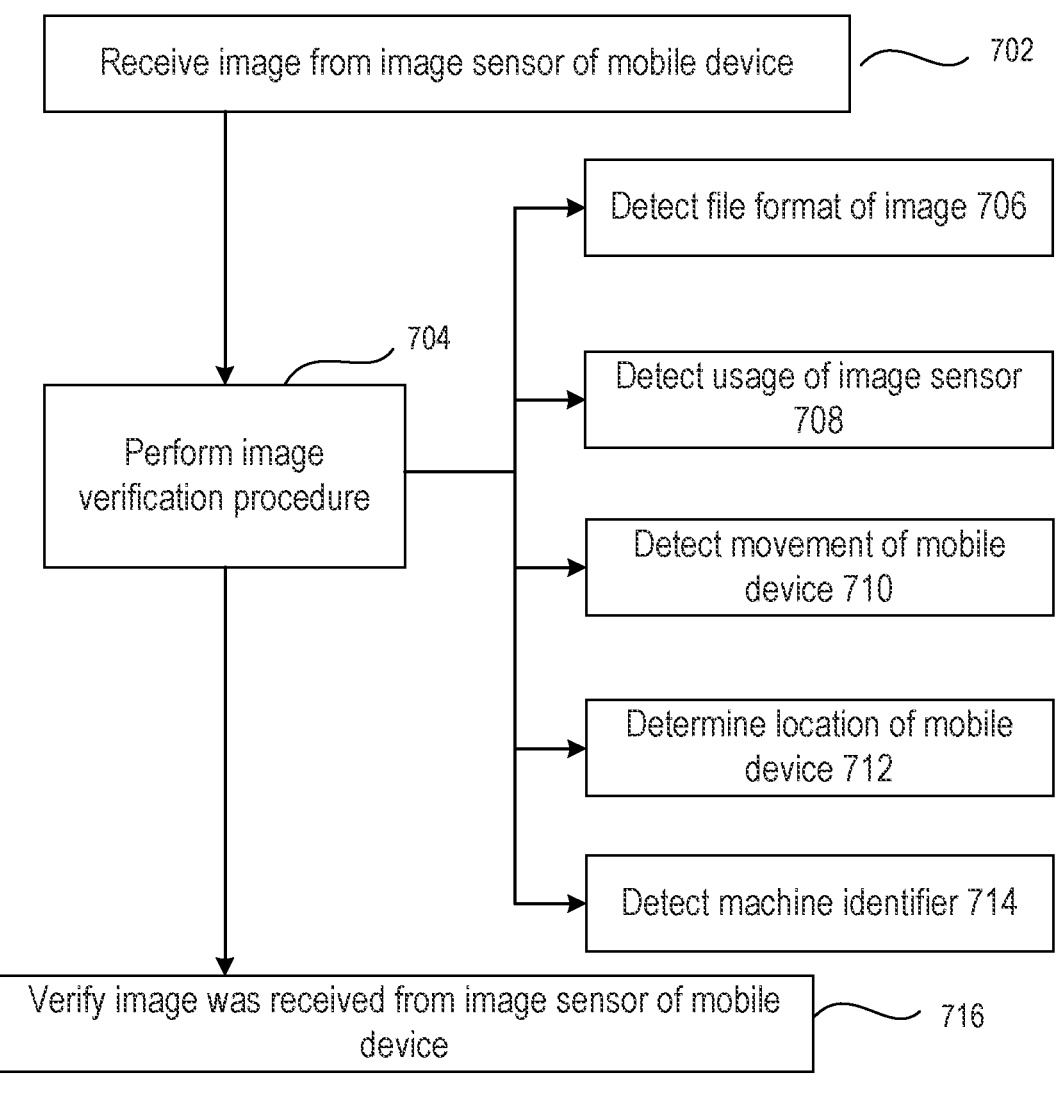
FIG. 7 is a flowchart of an exemplary method for verifying images, consistent with disclosed embodiments.

FIG. 7 is a flowchart of an exemplary method for verifying images, consistent with embodiments of the present disclosure. Method 700 can be performed using system 100.

For example, method 700 may be implemented by image-processing module 130 to verify that an image is authentic and originated from the image sensor of mobile device 190. In some embodiments, one or more steps of method 700 can be performed by mobile device 190. In various embodiments, one or more steps of method 700 can be performed by server system 105. In certain embodiments, method 700 can be performed entirely by server system 105, or entirely by mobile device 190.

At step 702, an image is received from (or accessed by) mobile device 190. For example, the image may be captured at mobile device 190 by image sensor 220. In some embodiments, the image may depict a real scene, such as the image received at steps 404 and 504. In some embodiments, the image is an augmented reality registration image comprising one or more virtual images overlaid onto an image received from the mobile device 190. For example, the image verification method 700 can verify that the augmented reality registration image includes an image captured at the mobile device 190 by image sensor 220.

The image verification procedure is then performed at step 704. Image-processing module 130 may verify that the image was received from an image sensor 220 of mobile device 190 by performing one or more of steps 706-714. For example, at step 706, image-processing module 130 may detect a file format of the image at step 706. For example, sensor 220 may capture an image and generate image data using a specific file format. In some aspects, the file format may include a "live" image file, comprising a video file and an image file. As another example, at step 708, image-processing module 130 may detect usage of image sensor 220. For example, augmented reality application 214 or processor 202 may transmit a confirmation that image sensor 220 was used when transmitting the image from mobile device 190 for verification. As another example, metadata embedded in the image, such as a time stamp at the time of image creation, may be compared to a time the image sensor 220 was used to capture the image. As another example, at step 710, image-processing module 130 may verify the image by detecting movement of the mobile device 190 (e.g. using location sensor 204) at the time the image was captured by sensor 220. As yet another example, at step 712, image-processing module 130 may determine a location of mobile device 190 and compare the determined location to geolocation metadata embedded in the image at the time of capture, as disclosed above with respect to FIG. 6. For example, location determination system 140 may determine the location of the mobile device 190 and transmit the determined location to image-processing module 130 to perform the image verification procedure. As another example, at step 714, image-processing module 130 may verify the image by detecting a unique device identifier for the user device and comparing the detected unique device identifier to device identifier information embedded in the image at the time of capture.

At step 716, image-processing module 130 may verify that the image was received from image sensor 220 of mobile device 190 using one or more of steps 706-714. In some embodiments, method 400 requires image verification before storing the augmented reality image in step 410. In some embodiments, method 500 requires image verification before authenticating a user.

Figure 8:
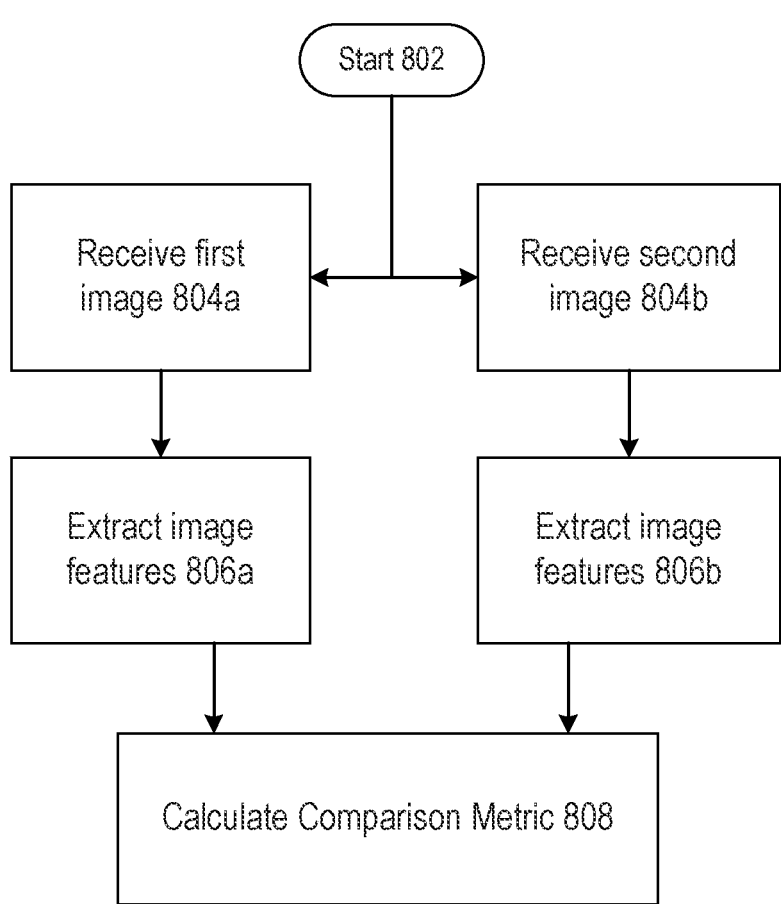
FIG. 8 is a flowchart of an exemplary method for calculating comparison metrics between images, consistent with disclosed embodiments.

FIG. 8 is a flowchart of an exemplary method for calculating comparison metrics between images, consistent with embodiments of the present disclosure. Method 800 can be performed using system 100. In some embodiments, one or more steps of method 800 can be performed by mobile device 190. In various embodiments, one or more steps of method 800 can be performed by server system 105. In certain embodiments, method 800 can be performed entirely by server system 105, or entirely by mobile device 190. In some embodiments, the comparison metric is calculated by image-processing module 130 using machine learning techniques. In some embodiments, the comparison metric is calculated by image-processing module 130 using a convolutional neural network.

After starting in step 802, image-processing module 130 receives a first image in step 804a. For example, first image may be received from memory, such as memory 160, database 180, or mobile device 190. After step 804a, image-processing module 130 can extract machine-learning features from the image using a convolutional neural network in step 806a. Similarly, after starting in step 802, image-processing module 130 receives a second image in step 804b. For example, second image may be received from memory, such as memory 160, database 180, or mobile device 190. After step 804b, image-processing module 130 can extract machine-learning features from the second image using a convolutional neural network in step 806b. In some aspects, system 100 can be configured to extract machine-learning features from the first and second images using different components of system 100. For example, server system 105 can extract the machine-learning features of the second image, and mobile device 190 can extract the machine-learning features of the first image. The extracted features may include unique features relating to the images, such as a landmark or object depicted within the image. In some embodiments, server system 105 can determine the coordinates of the extracted features within the image.

In some embodiments, first and second images may include registration images depicting a real scene, virtual images depicting virtual objects, and/or augmented reality images generated during methods 400 and/or 500. For example, image-processing module 130 may extract machine learning features from the registration image and the augmented reality image (for example, the augmented reality image generated as described in FIG. 5) to calculate comparison metric 808. As another example, image-processing module 130 may extract machine learning features from the registration image and the base first image (for example, the first image as described in FIG. 5) to calculate comparison metric 808. As another example, image-processing module 130 may extract machine learning features from the augmented reality registration image and the augmented reality image (for example, the augmented reality image generated as described in FIG. 5) to calculate comparison metric 808. As another example, image-processing module 130 may extract machine learning features from augmented reality registration image and the augmented reality image (for example, the augmented reality image generated as described in FIG. 5) to calculate comparison metric 808.

After steps 806a and 806b, image-processing module 130 may calculate a comparison metric in step 808. In some embodiments, the calculated comparison metric may reflect a percentage match between the first and second images. This calculation can involve inputting the machine-learning features extracted from the first and second image data into a classifier, such as another neural network. In additional embodiments, image-processing module 130 can be configured to calculate a metric based on the extracted machine-learning features (e.g., an inner product of the machine learning features extracted from the first image data and the machine learning features extracted from the second image). A value of the metric can indicate the degree of similarity between the images. In some instances values of the metric can increase with increasing similarity. In some embodiments, the calculated comparison metric may reflect a degree of similarity between the virtual object's position within the augmented reality registration image and the virtual object's position within the augmented reality image (for example, the augmented reality image generated as described in FIG. 5). For example, the coordinates of the extracted features within the image determined at steps 806a, 806b may be used to calculate the comparison metric.

In some embodiments, image-processing module 130 may calculate first comparison metric associated with a comparison of the augmented reality image to one or more stored augmented reality registration images. The image-processing module 130 may calculate a second comparison metric associated with a comparison of the first image with one or more stored registration images. In some embodiments, the augmented reality image is matched to the augmented reality registration image based on the first and second comparison metrics, as further discussed below with respect to FIG. 10.

Figure 9:
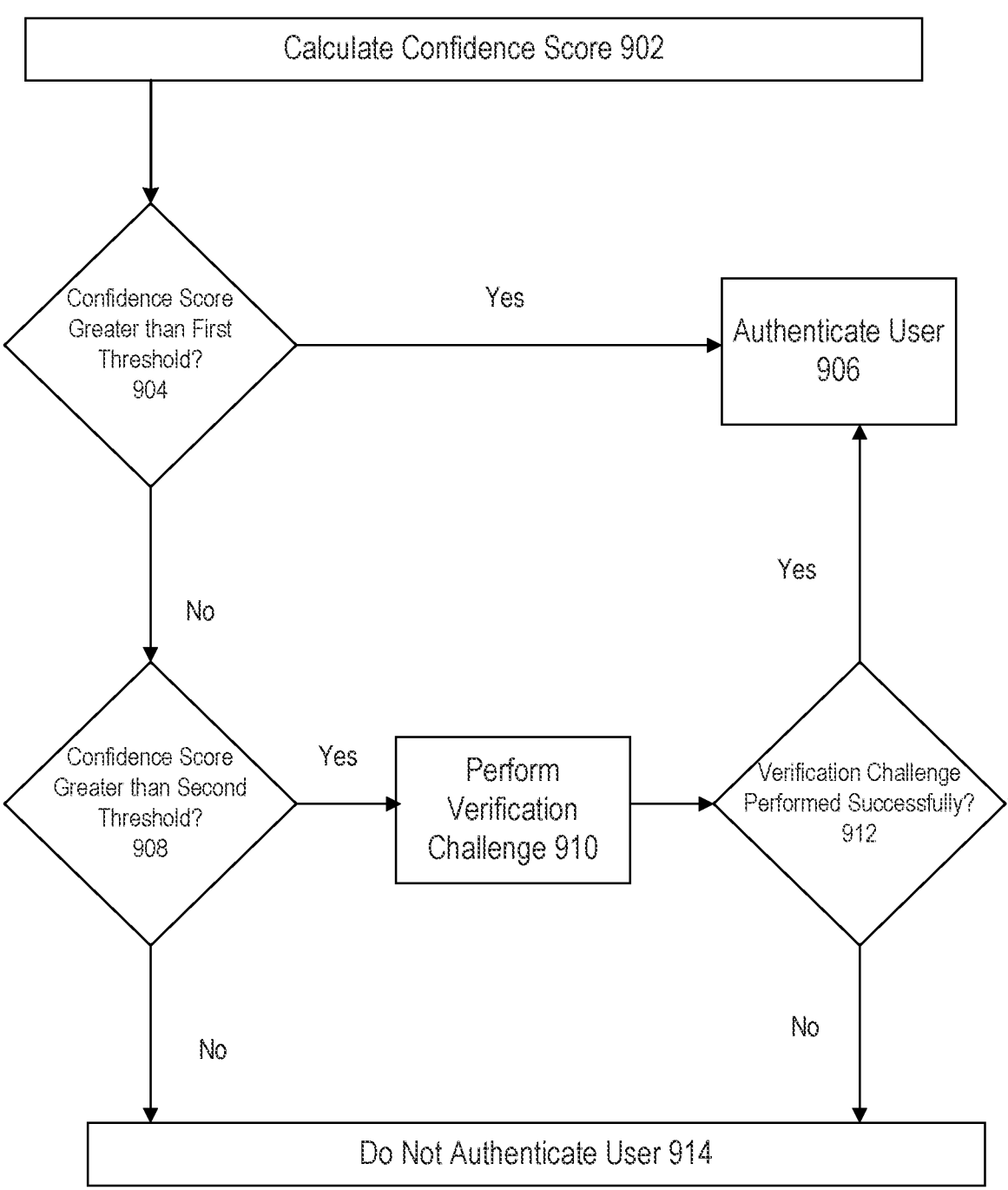
FIG. 9 is a flowchart of an exemplary method for using a confidence score to authenticate users, consistent with disclosed embodiments.

FIG. 9 is a flowchart of an exemplary method for using a confidence score to authenticate users, consistent with embodiments of the present disclosure. Method 900 can be performed using system 100. In some embodiments, one or more steps of method 900 can be performed by mobile device 190. In various embodiments, one or more steps of method 900 can be performed by server system 105. In certain embodiments, method 900 can be performed entirely by server system 105, or entirely by mobile device 190.

At step 902, server system 105 calculates a confidence score representing a level of confidence that a first image matches a second image. In some embodiments, the first and second images include the images depicting a real scene received at steps 404 and 504, the virtual images received at steps 406 and 506, and/or the augmented reality images disclosed in steps 408 and 508. In some embodiments, the confidence score is calculated by image-processing module 130, as disclosed in further detail below with respect to FIG. 10.

At step 904, server system 105 compares the calculated confidence score to a first predetermined threshold. In some embodiments, steps 904-914 are performed by authentication module 120. For example, authentication module 120 may determine that the confidence score is greater than the first threshold and proceed to authenticate the user at step 906. If the authentication module 120 determines that the confidence score is less than the first threshold, it may compare the confidence score to a second predetermined threshold at step 908. If the confidence score is determined to be less than the second threshold, authentication module 120 proceeds to step 914 and does not authenticate the user. In some embodiments, if the confidence score is determined to be less than the second threshold, authentication module 120 proceeds to step 910 and performs a verification challenge. For example, the verification challenge may include an over-the-phone challenge. In some embodiments, the over-the-phone challenge includes transmitting a token or passcode to the mobile device 190 associated with the user. The user is then prompted through a user interface to enter the transmitted token or passcode. Authentication module 120 then compares the transmitted and received tokens or passcode to determine if there is a match. The authenticated module 120 then proceeds to step 906 to authenticate the user when there is match. In some embodiments, the token or passcode is a one-time token or passcode that expires after a predetermined amount of time.

Figure 10:
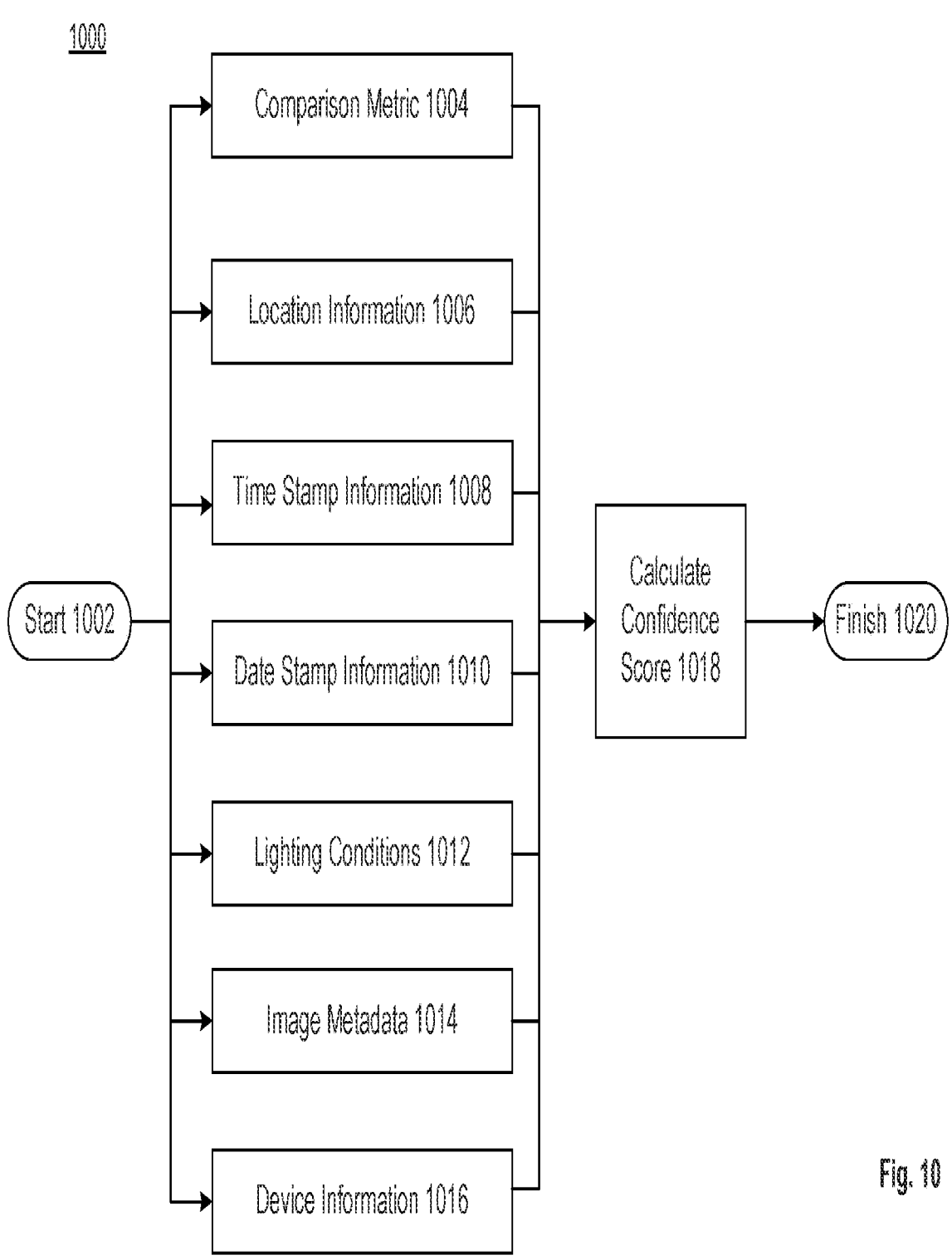
FIG. 10 is a flowchart of an exemplary method for calculating a confidence score, consistent with disclosed embodiments.

FIG. 10 is a flowchart of an exemplary method for calculating a confidence score, consistent with embodiments of the present disclosure. In some embodiments, method 1000 is implemented by image-processing module 130 on server system 105 or on mobile device 190. In some embodiments, one or more steps of method 1000 can be performed by mobile device 190. In various embodiments, one or more steps of method 1000 can be performed by server system 105. In certain embodiments, method 1000 can be performed entirely by server system 105, or entirely by mobile device 190.

Method 1000 begins at step 1002 to calculate a confidence score representing a level of confidence that a first image matches a second image. In some embodiments, the first and second images include the images depicting a real scene received at steps 404 and 504, the virtual images received at steps 406 and 506, and/or the augmented reality images disclosed in steps 408 and 508. In some embodiments, image-processing module 130 may calculate the confidence score at step 1018 by comparing one or more factors associated with the first and second images. For example, the one or more factors may include comparison metric 1004, location information 1006, time stamp information 1008, date stamp information 1010, lighting conditions 1012, image metadata 1014, and device information 1016. In some embodiments, the factors are weighted to calculate the confidence score.

In some embodiments, comparison metric 1004 may be obtained from image-processing module 130 as disclosed above with respect to FIG. 8. For example, the comparison metric 1004 may include a percentage match between the first and second images. In some embodiments, comparison metric 1004 may comprise one or more comparison metrics, as discussed above with respect to FIG. 8. For example, comparison metric 1004 may comprise a first comparison metric associated with a comparison of the augmented reality image to one or more stored augmented reality registration images, and may also comprise a second comparison metric associated with a comparison of the first image with one or more stored registration images.

In disclosed aspects, location information 1006 includes location information obtained from location determination system 140 and embedded in the first and second images, as disclosed in FIG. 6 above. For example, image-processing module 130 may compare geolocation metadata embedded in the first and second images. In some embodiments, image-processing module 130 may compare device information 1016 associated with a device from which the first and second images were captured to ensure that the devices used to perform the augmented reality authentication are the same devices. For example, such device information 1016 may include a unique device identifier, a make, and/or a model of the device. Image-processing module 130 may compare time stamp information 1008 or date stamp information 1010 embedded in the first and second images to verify the images are authentic. Image-processing module 130 may compare lighting conditions 1012 or other image metadata 1014, such as date of creation, author of image, and other technical information describing the image. At step 1018, image-processing module 130 calculates the confidence score by weighing one or more of the factors 1004-1016 and ends at step 1020. In some embodiments, the image verification procedure disclosed in FIG. 7 may be used as a factor for calculating the confidence score. In some embodiments, the location of the device (e.g., determined by location determination system 140) may be compared to location information 1006 embedded in the first or second images and used as a factor for calculating the confidence score.

FIG. 11 is an illustration of a mobile device capturing an image of a real-world environment, consistent with embodiments of the present disclosure. As disclosed above, the mobile device 190 may be a mobile device, a tablet, a laptop, a cellular device, a personal computer, a smartphone (e.g., Apple iPhone, Blackberry, Android-based phones, etc.), and/or a wearable smart device such as a smart watch. The mobile device 190 may include an image sensor 220 such as a camera. A user of the mobile device may be prompted through a graphical user interface to capture an image of a real scene 1102 using image sensor 220 of mobile device 190. The captured image may be displayed on a user interface 1104 of the mobile device display. For example, the user may capture a real scene 1102 of a real-world environment such as the user's office. The captured image of the real scene 1102 may be stored or processed by server system 105 or mobile device 190 as the registration image of FIG. 4 or first image of FIG. 5.

Figure 12:
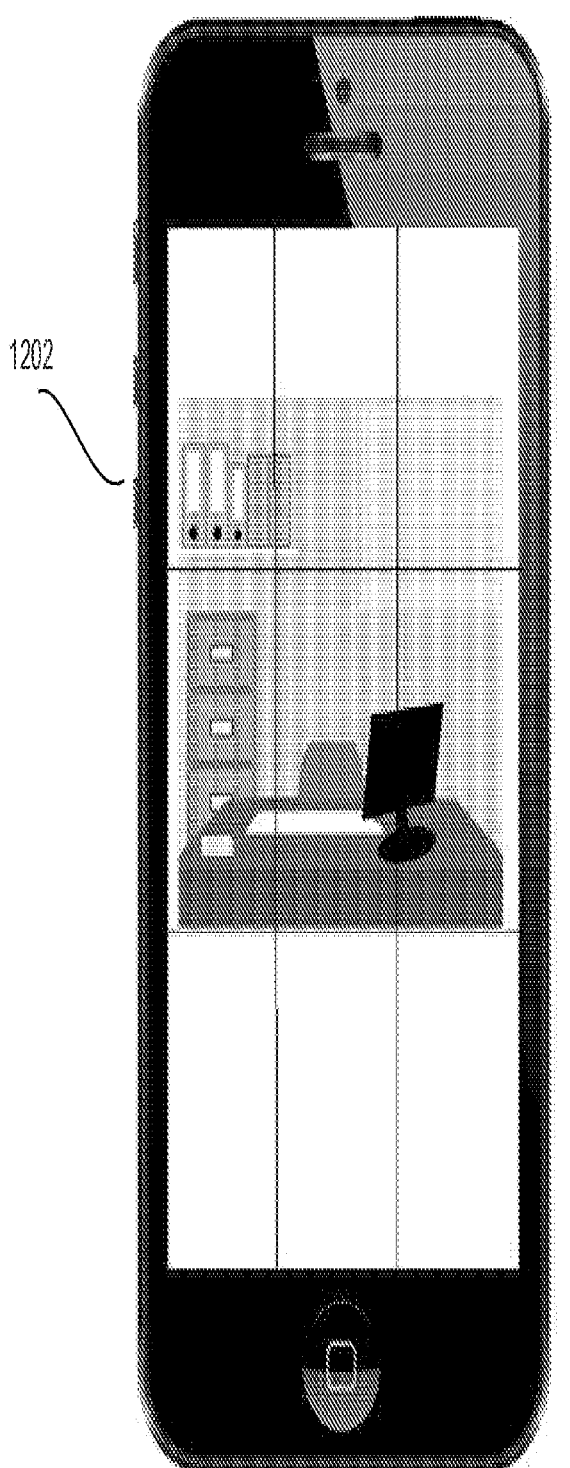
FIG. 12 is an illustration of a user interface on a mobile device, consistent with disclosed embodiments.
Figure 13:
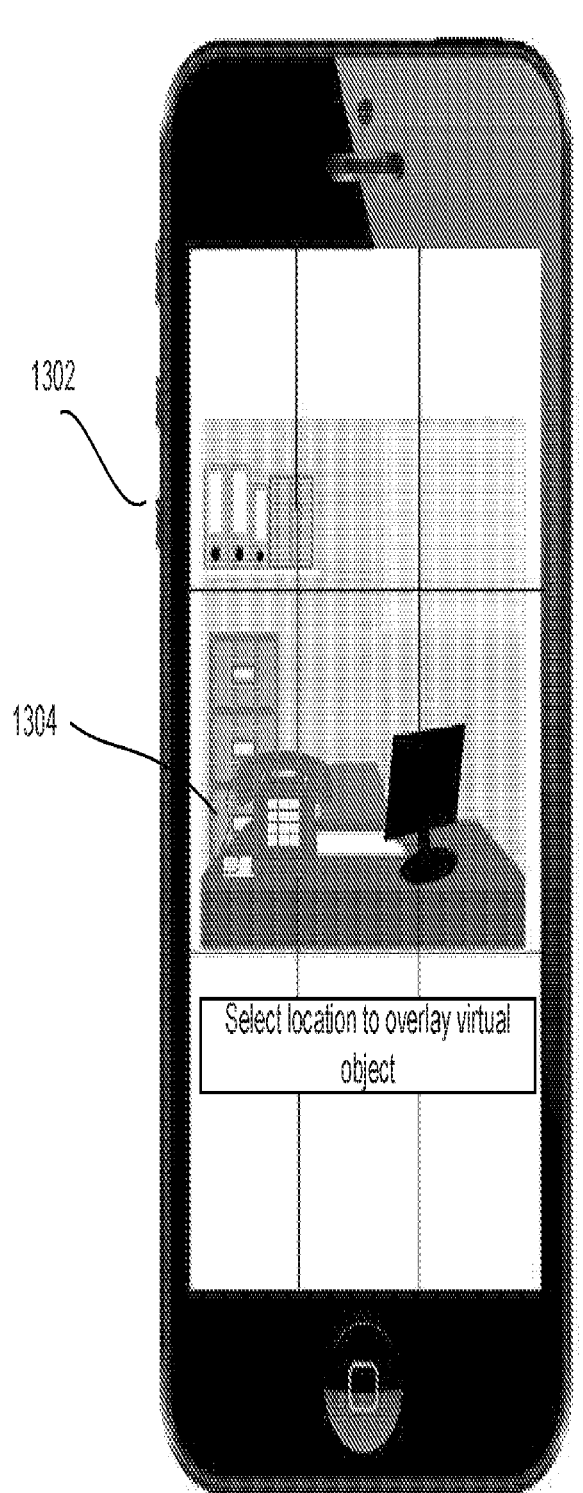
FIG. 13 is another illustration of a user interface on a mobile device, consistent with disclosed embodiments.

FIGS. 12-13 are exemplary illustrations of a user interface on a mobile device, consistent with embodiments of the present disclosure. In some embodiments, the exemplary graphical user interfaces may be displayed on mobile device 190 and may take the image from image sensor 220 and modify it to include elements displayed in a user interface on mobile device 190. In some embodiments, the exemplary graphical user interfaces may be displayed when a user opens an application running on mobile device 190, activating the image sensor 220.

Graphical user interface 1202 shows an interface with a grid outline to assist the user in capturing real scene 1102. The graphical user interface 1202 may prompt the user to capture an image, such as real scene 1102. The interface 1202 may further prompt the user to modify the captured image, for example, by prompting the user to select one or more virtual images to overlay on the captured real scene 1102 to generate an augmented reality image. For example, the user may be prompted through user interface 1302 to select a virtual image, such as virtual object 1304 depicting a telephone, to overlay on the captured real scene 1102. The user may select a location on the grid of user interface 1304 on which to overlay the selected virtual object 1304. In some embodiments, the user selects the location on the grid to overlay the virtual image before selecting the virtual image from a list of available virtual images. For example, the user selects a location on the grid, prompting the user interface 1304 to provide a dialogue box prompting the user to select a virtual image from a list of available virtual images. Once the user selects the desired virtual image, it is overlayed on the captured real scene 1102 at the selected location on the grid. In some embodiments, the user selects the desired virtual image first, and then selects the location on the grid on which to overlay the virtual image. In some embodiments, the user selects more than one virtual image to overlay on the captured image. In some embodiments, the steps of capturing the real scene, selecting the virtual image, and overlaying the virtual image onto the real scene to generate the augmented reality image are performed entirely by server system 105 or by mobile device 190. In some embodiments, the images are stored temporarily on mobile device 190 for processing, and then transmitted to server system 105 for storage and/or further processing.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system comprising:
one or more processors and non-transitory media storing instructions that, when executed by the one or more processors, cause operations comprising:
obtaining, via mobile device, video data of a real scene;
obtaining a user-selected indication related to a manipulation to the video data;

generating, based on the user-selected indication, augmented reality video data by applying the manipulation to the video data;
generating a confidence score based on comparing images derived from the augmented reality video data with a registration image; and
authenticating a user based on the confidence score being above a threshold.

2. The system of claim 1, wherein the augmented reality video data comprises a modified instance of the video data that reflects the manipulation to the video data.

3. The system of claim 1, wherein generating the confidence score comprises:
extracting machine learning features from the images derived from the augmented reality video data; and
generating the confidence score based on comparing the machine learning features derived from the augmented reality video data with machine learning features of the registration image.

4. The system of claim 1, wherein generating the confidence score comprises obtaining the confidence score by inputting representations of the images derived from the augmented reality video data into an input layer of a neural network comprising the input layer and one or more middle layers, and an output layer, the input layer being configured to receive a matrix for red, green, and blue pixels of an image derived from the augmented reality video data, each of the one or more middle layers and the output layer comprising a function configured to receive one or more values outputted by a preceding layer of the neural network.

5. A method comprising:
obtaining a user-provided indication related to a manipulation to image data obtained via a user device of a user;
generating, based on the user-provided indication, a modified image by applying the manipulation to the image data obtained via the user device;
generating a confidence score based on comparing the modified image with a prestored image; and
authenticating the user of the user device, wherein authenticating the user comprises:
determining that the confidence score is below a threshold and within a predetermined range of the threshold;
based on the confidence score being below the threshold and within the predetermined range of the threshold, initiating a verification challenge different from the comparison of the modified image with the prestored image; and
authenticating the user based on completion of the verification challenge.

6. The method of claim 5, wherein generating the confidence score comprises:
extracting machine learning features from the modified image; and
generating the confidence score based on comparing the machine learning features from the modified image with machine learning features of the prestored image.

7. The method of claim 5, wherein generating the confidence score comprises obtaining the confidence score by inputting a representation of the modified image into an input layer of a neural network comprising the input layer and one or more middle layers, and an output layer, the input layer being configured to receive a matrix for red, green, and blue pixels in the modified image, each of the one or more middle layers and the output layer comprising a function configured to receive one or more values outputted by a preceding layer of the neural network.

8. The method of claim 5, wherein comparing the modified image comprises comparing features of image regions, modified to overlay a virtual object selected by the user on the image data, with features of the prestored image.

9. The method of claim 5, wherein comparing the modified image comprises comparing features of image regions, modified to overlay a first virtual object at a first image location on the image data and a second virtual object at a second image location, different from the first image location, on the image data, with features of the prestored image.

10. The method of claim 5, wherein initiating the verification challenge comprises generating a one-time temporary authentication token based on the confidence score, derived from the comparison of the modified image with the prestored image, being below the threshold and within the predetermined range of the threshold.

11. The method of claim 5, wherein generating the confidence score comprises generating the confidence score for authenticating the user based on comparing the modified image with the prestored image and one or more lighting conditions associated with the image data with one or more lighting conditions associated with the prestored image.

12. One or more non-transitory computer-readable media storing instructions, that when executed by one or more processors, cause operations comprising:

obtaining a user-provided indication related to a manipulation to image data obtained via a user device of a user;

generating, based on the user-provided indication, a modified image by applying the manipulation to the image data obtained via the user device;

generating a confidence score based on comparing the modified image with a prestored image; and authenticating the user of the user device, wherein authenticating the user comprises:

determining that the confidence score is below a threshold and within a predetermined range of the threshold;

based on the confidence score being below the threshold and within the predetermined range of the threshold, initiating a verification challenge different from the comparison of the modified image with the prestored image; and authenticating the user based on completion of the verification challenge.

13. The one or more non-transitory computer-readable media of claim 12, wherein comparing the modified image with the prestored image comprises:

extracting machine learning features from the modified image; and comparing the modified image with the prestored image based on the machine learning features from the modified image with machine learning features of the prestored image.

14. The one or more non-transitory computer-readable media of claim 12, wherein authenticating the user of the user device comprises:

obtaining, as part of an image file comprising the image data, geolocation data in connection with using the image data for authenticating the user; and authenticating the user based on the completion of the verification challenge and the geolocation data.

15. The one or more non-transitory computer-readable media of claim 12, wherein comparing the modified image comprises comparing features of image regions, modified to overlay a virtual object selected by the user on the image data, with features of the prestored image.

16. The one or more non-transitory computer-readable media of claim 12, wherein comparing the modified image comprises comparing features of image regions, modified to overlay a first virtual object at a first image location on the image data and a second virtual object at a second image location, different from the first image location, on the image data, with features of the prestored image.

17. The one or more non-transitory computer-readable media of claim 12, wherein generating the confidence score comprises generating the confidence score for authenticating the user based on comparing the modified image with the prestored image and geolocation metadata associated with the image data with geolocation metadata associated with the prestored image.

18. The one or more non-transitory computer-readable media of claim 12, wherein generating the confidence score comprises generating the confidence score for authenticating the user based on comparing the modified image with the prestored image and a device identifier associated with the image data with a device identifier associated with the prestored image.

19. The one or more non-transitory computer-readable media of claim 12, wherein generating the confidence score comprises generating the confidence score for authenticating the user based on comparing the modified image with the prestored image and one or more lighting conditions associated with the image data with one or more lighting conditions associated with the prestored image.

* * * * *